June 25, 1957 H. E. BREMER 2,796,824
TOASTER
Filed May 12, 1954
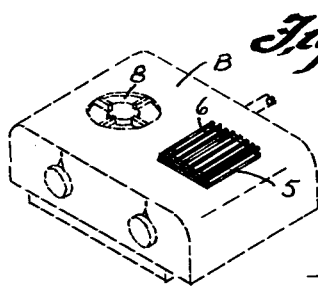
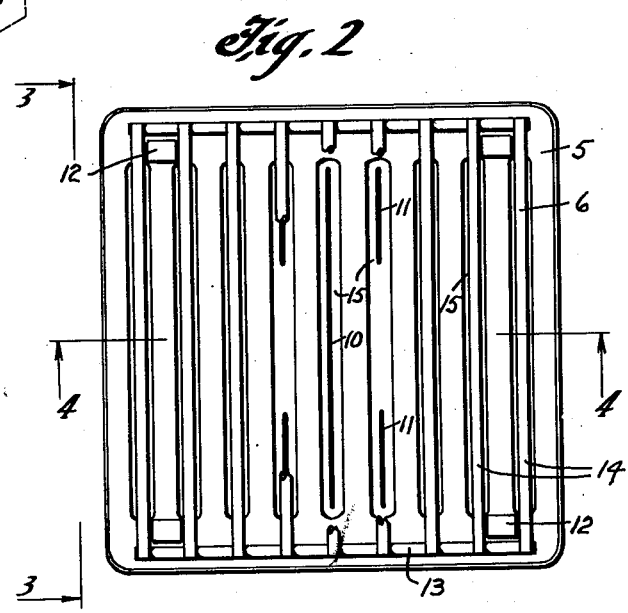
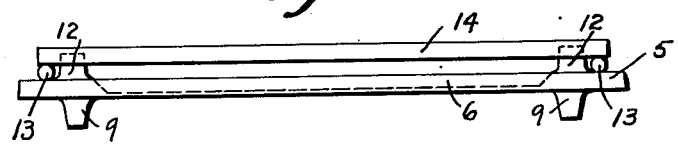
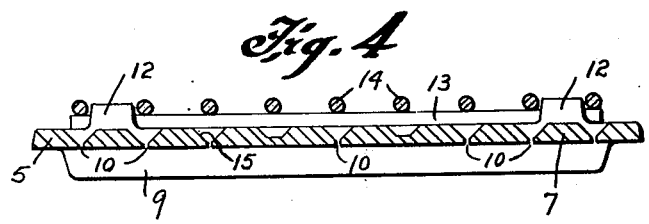
INVENTOR.
Harry E. Bremer
BY Quarles & French
Att'ys

United States Patent Office 2,796,824
Patented June 25, 1957

2,796,824

TOASTER

Harry E. Bremer, Whitefish Bay, Wis.

Application May 12, 1954, Serial No. 429,201

4 Claims. (Cl. 99—447)

The invention relates to toasters.

The object of the invention is to provide a toaster for use in making toast over a flame heated cooking element such as a gas plate or alcohol stove which is of simple construction but very effective in operation. More particularly, the invention includes a heat storage plate and a grid mounted on the plate, the plate having spaced openings alined with parts of the grid, the spacing of the grid from the plate and the size of the openings preferably having a definite relation to the size of the wire forming the grid.

A further object of the invention is to provide a toaster of compact form so that it requires a small storage space.

The invention further consists in the several features hereinafter set forth and more particularly defined by claims at the conclusion hereof.

In the drawings:

Fig. 1 is a perspective view of the toaster embodying the invention mounted on a gas stove;

Fig. 2 is a plan view of the toaster, parts being broken away;

Fig. 3 is an elevation view of the toaster looking along the line 3—3 of Fig. 2;

Fig. 4 is a detailed horizontal sectional view taken on the line 4—4 of Fig. 2.

The toaster includes a heat storage and gas flame control metal plate 5 and a metal grid 6.

The plate 5 has a flat body portion 7 which is supported in spaced relation to the grid 8 of the stove or flame heated cooking element by a pair of spaced ribs 9 running lengthwise of opposite sides of the plate whose height is about two diameters of the grid wires hereinafter described.

The plate has a series of spaced narrow openings or slits. All of the slits 10 are full length openings extending parallel to each other and across the major part of one dimension of the plate and including a centrally located slit while at either side of said central slit the narrow openings or slits 11 extend from either side about a third of the distance or length of the other slits 10. The plate has bosses or grid locator projections 12.

The grid 6 is formed by spaced base wires 13 to which a series of spaced top wires 14 are secured at their ends by brazing or spot welding, said wires 14 running at right angles to said base wires. The grid is of a size to take a slice of the conventional loaf of bread. The spacing of the top wires is such that these wires along their longitudinal axes aline with the slits 10 and 11. The base wires 13 support the top wires above the top of the plate at a distance equal to the diameter of these wires and the width of the projections 12 is such that they fit between adjacent wires 14 of the grid.

Each of the slits 10 and 11 have flaring outlets 15 which flare from the narrower part of these slits to the top of the plate. The narrower part of the slit is about one-quarter of the diameter of the grid wire while the wider part is about twice the diameter, these proportions having been found to give the best results.

It will be noted from the drawings that total cross-sectional area of the plate is several times (three or more) the cross-sectional area of all the wires of the grid.

In use the toaster is placed on one of the grids 8 of a gas plate, such as B, and is heated up for a few minutes with a high gas flame. Thereafter, the gas is turned down and the slice of bread placed on the top of the grid wires 14, and in about one-half of a minute this side of the bread is toasted and the slice is then turned over and toasted on the other side for about one-half of a minute. In the turned down position of the gas, the gas flames do not reach the bottom of the plate but terminate about half the distance from the bottom to the top of the ribs 9. Thus only highly heated air passes through the slits 10 and 11 to heat the slice of bread to a toasting temperature.

I desire it to be understood that this invention is not to be limited to any particular form or arrangement of parts except in so far as such limitations are included in the claims.

What I claim as my invention is:

1. In a flame operated toaster, the combination of a metal heat storage plate having a flat body portion and burner grid contacting portions, said body portion having a series of spaced parallel slits extending thereacross to points spaced from an adjacent edge, the area of said slots being only a minor portion of the total area of the plate to permit a large amount of heat storage in said plate, said slits flaring outwardly at the top of said body portion, certain of the slits in the central portion of the plate extending only part way across said plate, and a wire grid having spaced base wires and a series of spaced top wires whose spacing corresponds with the spacing of said slits to dispose said top wires above said slits and in axial alinement therewith to form a flame barrier, the total cross-sectional area of the plate being several times the cross-sectional area of all the wires of the grid.

2. In a flame operated toaster, the combination of a metal heat storage plate having a flat body portion and spaced burner grid contacting ribs, said body portion having a series of spaced parallel slits extending thereacross to points spaced from an adjacent edge, the area of said slits being only a minor portion of the total area of the plate to permit a large amount of heat storage in said plate, said slits flaring outwardly at the top of said body portion, and a wire grid having spaced base wires and a series of spaced top wires whose spacing corresponds with the spacing of said slits to dispose said top wires above said slits and in axial alinement therewith to form a flame barrier, the total cross-sectional area of the plate being several times the cross-sectional area of all the wires of the grid.

3. In a flame operated toaster, the combination of a metal heat storage plate having a flat body portion and burner grid contacting portions, said body portion having a series of spaced parallel slits extending thereacross to points spaced from an adjacent edge, said slits flaring outwardly at the top of said body portion, certain of the slits in the central portion of the plate extending only part way across said plate, said slits forming only a minor portion of the plate area, a wire grid having spaced base wires and a series of spaced top wires whose spacing corresponds with the spacing of said slits to dispose said top wires above said slits and in axial alinement therewith, and bosses projecting between adjacent top wires of the grid to maintain the above specified alinement.

4. In a flame operated toaster, the combination of a wire grid having spaced base wires and a series of spaced top wires secured at their ends to said base wires, a metal heat storage plate having a flat body portion upon which said base wires rest and provided with burner grid contacting portions of the height of the wire grid, said body portion having a total cross sectional area several times that of all the wires of the grid and having a series of spaced parallel slits extending across to points spaced from an adjacent edge, said slits at the bottom portion of the plate being of a width about one quarter of the wire grid diameter and flaring outwardly at the top of said bottom portion to a width of about twice the diameter of the grid wire.

References Cited in the file of this patent

UNITED STATES PATENTS

| | | |
|---|---|---|
| 1,698,933 | Chartier | Jan. 15, 1929 |
| 1,789,330 | Ballard | Jan. 20, 1931 |

FOREIGN PATENTS

| | | |
|---|---|---|
| 453 | Great Britain | Oct. 20, 1852 |
| 459,764 | Great Britain | Jan. 14, 1937 |